(12) United States Patent
Raja Gopal et al.

(10) Patent No.: US 11,250,167 B2
(45) Date of Patent: Feb. 15, 2022

(54) SECURE EXTERNAL SOC DEBUGGING (71) Applicant: Intel Corporation, Santa Clara, CA (US)

(72) Inventors: R Selvakumar Raja Gopal, Tapah (MY); Asad Azam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 16/584,110

(22) Filed: Sep. 26, 2019

(65) Prior Publication Data

US 2020/0019734 A1    Jan. 16, 2020

(51) Int. Cl.
| G06F 21/76 | (2013.01) |
| H04L 9/06 | (2006.01) |
| G06F 21/60 | (2013.01) |
| G01R 31/3177 | (2006.01) |
| G01R 31/317 | (2006.01) |
| G06F 21/44 | (2013.01) |

(52) U.S. Cl.
CPC ......... *G06F 21/76* (2013.01); *G01R 31/3177* (2013.01); *G01R 31/31713* (2013.01); *G06F 21/44* (2013.01); *G06F 21/606* (2013.01); *H04L 9/0631* (2013.01)

(58) Field of Classification Search
CPC ........ G06F 21/76; G06F 21/44; G06F 21/606; G01R 31/31713; G01R 31/3177; H04L 9/0631
See application file for complete search history.

(56) References Cited

U.S. PATENT DOCUMENTS

| 8,799,728 B2* | 8/2014 | Zhong | G01R 31/31705 714/724 |
|---|---|---|---|
| 9,995,789 B2* | 6/2018 | Dewan | G06F 11/3656 |
| 2008/0034334 A1* | 2/2008 | Laouamri | G06F 11/2294 716/136 |
| 2008/0148343 A1* | 6/2008 | Taniguchi | G06F 21/71 726/1 |
| 2015/0331043 A1* | 11/2015 | Sastry | G01R 31/3177 714/727 |
| 2016/0180114 A1* | 6/2016 | Sastry | G06F 21/85 713/189 |
| 2018/0149698 A1* | 5/2018 | Goel | G01R 31/31813 |
| 2019/0303268 A1* | 10/2019 | Ansari | G06F 11/2236 |
| 2020/0348361 A1* | 11/2020 | Kurts | H04L 9/0631 |

* cited by examiner

*Primary Examiner* — Michael R Vaughan
(74) *Attorney, Agent, or Firm* — Schwegman Lundberg & Woessner, P.A.

(57) ABSTRACT

Various systems and methods for implementing secure system-on-chip (SoC) debugging are described herein. A method of providing secure system-on-a-chip (SoC) debugging, comprises: receiving, from a remote host at a debug companion circuit, a debug initiation request to initiate a debugging session with an SoC associated with the debug companion circuit; encrypting, at the debug companion circuit, a debug handshake command; transmitting the debug handshake command to the SoC from the debug companion circuit, wherein the SoC is configured to authenticate the debug companion circuit, and configure intellectual property (IP) blocks on the SoC to expose debug data to the debug companion circuit in response to authenticating the debug companion circuit; and managing a secure connection with the SoC to obtain debug data and report the debug data to the remote host.

28 Claims, 4 Drawing Sheets

SECURE EXTERNAL SOC DEBUGGING

TECHNICAL FIELD

The present disclosure relates generally to system-on-a-chip (SoC) implementations, and specifically to secure remote debugging of SoCs.

BACKGROUND

A system-on-a-chip (SoC) is an integrated circuit (IC) that includes a number of computer components on a single chip substrate. An SoC may include any number of component blocks (e.g., intellectual property blocks or IP blocks) that perform a function, such as graphics processing, memory management, general or special-purpose processing, etc. The SoC may also include a fabric to connect the various IP blocks with each other (e.g., intra-chip communication) or with components external to the SoC (e.g., inter-chip communications) via an interconnect (e.g., bus).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

With the emerging dominance of the SoCs in the market, SoC platforms are becoming sophisticated and comprehensive platforms comprising a large number of intellectual property (IP) blocks ranging from video/audio/image processing, to myriad number of sensors, to the low-level general-purpose processors and input-output interfaces. Fixed-function and programmable IP blocks enable manufacturers to provide differentiation in the marketplace while reducing manufacturing costs.

No two SoCs are the same; each SoC has unique thermal properties, fuse controller properties, etc. An SoC vendor (e.g., manufacturer) may need to debug an SoC that has already shipped to the customer, such as an original equipment manufacturer (OEM). Some SoCs have security restrictions to prevent certain debugging procedures from being executed by anyone other than the SoC vendor.

Runtime diagnostics are further complicated in platforms designed to maintain functional safety (FUSA). FUSA runtime applications may include access to highly sensitive or proprietary information. FUSA SoCs are architected and designed with multiple layers of security to only allow secure access. This is conventionally achieved through requiring physical presence of experts assigned by the SoC providers. The expert operators may authenticate the SoC for trusted access and execute a detailed diagnostic flow when a platform failed during in-field operation. What is needed is a system to provide remote access to SoCs for debugging. Such a system should provide the same level of security for sensitive or proprietary information.

This document describes a secure and trusted environment within the platform boundary that allows for a safe agent on the platform to execute diagnostic and debugging flows for the components of the platform. The secure and trusted environment allows secure access to the debug information while the SoC is in-field.

As an example, a FUSA-compliant SoC integrates a debug transport IP that encrypts and decrypts debug commands and data being transported on and off the SoC. A companion chip is also placed on the platform to execute the diagnostic flow in conjunction with the debug transport IP on the SoC. The companion chip acts as the interface to the remote host.

Using encrypted communication, the SoC under test and the diagnostic coordinator in the companion chip are able to execute secure in-field diagnostic flows. The encryption ensures that the integrity of the data executed over debug fabrics cannot be compromised by an attacker who may be trying to snoop the platform traces during the diagnostic flow. The debug data is encrypted all the way to the SoC provider and the remote host, providing insightful data and efficient recovery mechanisms for a given failure. Using remote debugging also provides a broader presence for an SoC provider among the various customer sites worldwide. This reduces downtime and associated losses at customer sites and provides enhanced service to customers.

Figure 1:
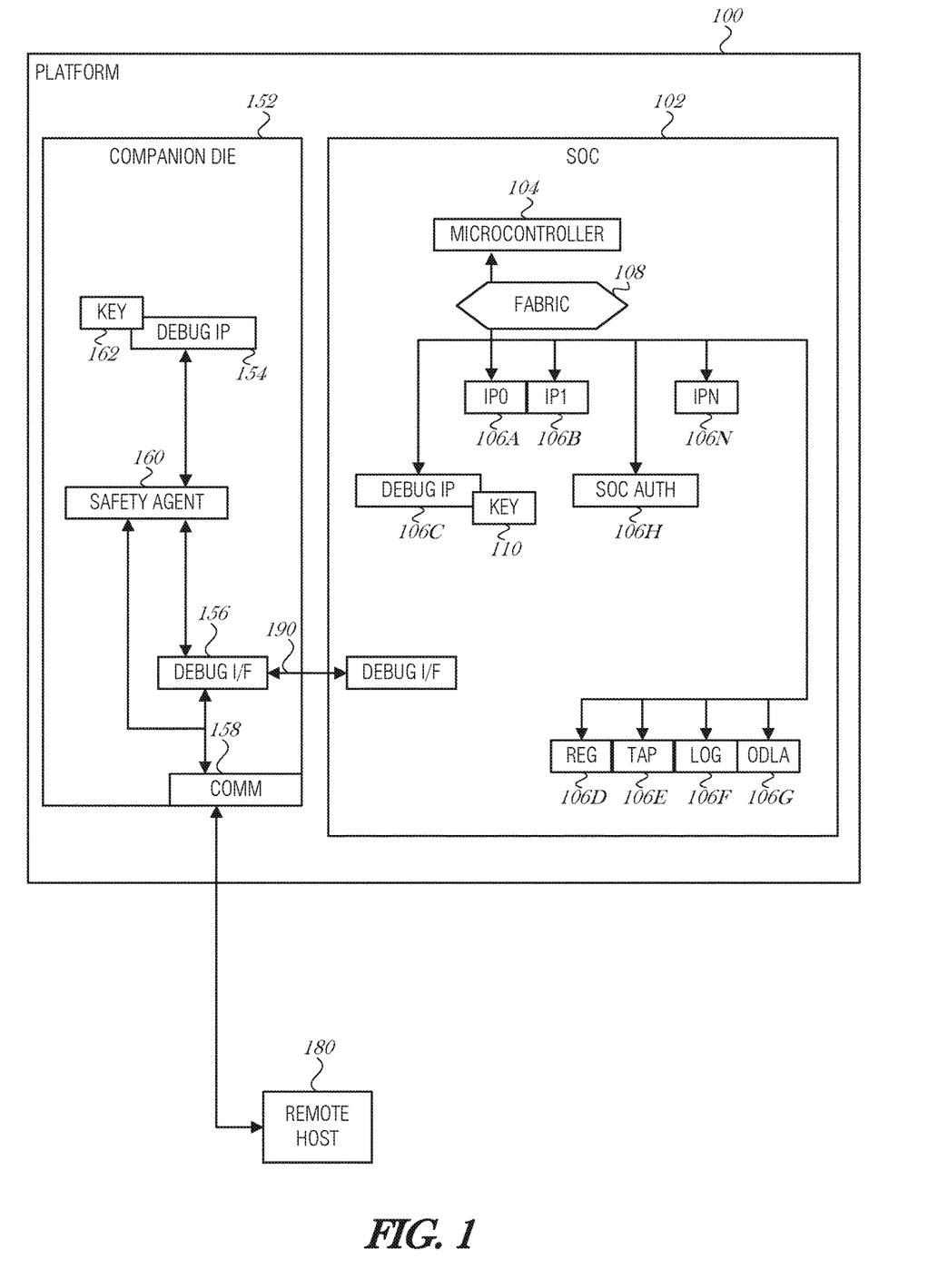
FIG. 1 illustrates an example platform that includes an SoC and companion die that enables secure remote debugging, according to an embodiment.

FIG. 1 illustrates an example platform 100 that includes an SoC 102 and companion die 152 that enables secure remote debugging, according to an embodiment. The platform 100 integrates the SoC 102 and the companion die 152 on the same physical medium, such as a printed circuit board. The example SoC 102 includes a microcontroller 104, which executes firmware to operate the SoC 102. The firmware of the microcontroller 104 includes a network stack, which allows the microcontroller 104 to communicate with external devices, such as companion die 152.

As illustrated, the SoC 102 includes IP blocks IP0 106A, IP1 106B, . . . , IPn 106N (collectively referred to as 106). An IP block 106 may be of varying types, including general-purpose processors (e.g., in-order or out-of-order cores), fixed function units, graphics processors or engines, I/O controllers, display controllers, media processors, modems, network interface devices, registers, etc.

The microcontroller 104 and the IP blocks 106 are connected to each other via a fabric 108, which is a hardware interconnect within the example SoC 102. The fabric 108 may be a "primary" fabric, which may be used for any "in-band communication" (e.g., memory, input/output (I/O), configuration, in-band messaging, etc.) between IP blocks 106, or a "sideband" fabric, which may be used for out-of-band communication (e.g., commands, statuses, interrupts, power management, fuse distribution, configuration shadowing, test modes, etc.) between IP blocks 106. In some embodiments, an SoC 102 has only a primary fabric; in other embodiments, an SoC 102 has both a primary fabric and a sideband fabric. In some embodiments, a sideband fabric is a routed "network" within the SoC 102, where each interface has a unique ID derived from its location in the SoC 102. The unique ID of an interface of an IP block 106 is used to route transmissions to or from the IP block 106 within the sideband fabric 108. Sideband fabrics (also known as "sideband networks") are used in some SoCs from Intel® and ARM®, for instance. Other SoC manufacturers may also use sideband networks.

In an embodiment, the IP blocks 106 include a Debug Transport IP block 106C. The Debug Transport IP block 106C is connected to a debug interface 108. Debug interface 108 may be of various types of interconnects, such as JTAG (Joint Test Access Group) interface, USB 2.0 (Universal Serial Bus), or I3C developed by Mobile Industry Processor Interface (MIPI) Alliance. The JTAG interface may be a two, four, or five pin interface depending on the version of JTAG implemented. I3C may operate in standard data rate (SDR) or high data rate (HDR) mode, depending on the implementation.

Other IP blocks 106 on the SoC 102 include registers 106D, test access ports (TAPs) 106E, crash log 106F, and on-die logic analyzer (ODLA) 106G. The registers 106D temporarily store operational data, state data, or the like. The TAPs 106E may be used to access any IP block 106 that has a TAP. In an embodiment, JTAG may be used to interface with TAPs 106E. The crash log 106F is a data store of state information that is captured when aberrant events are detected. The ODLA 106G is a block that collects all the hardware signals and captures them into a packet based on a timestamp.

Other components on the SoC 102 include the SoC authentication block 106H, which is an IP block that handles authentication of access attempts. When an attempt to access the debug features of the SoC is validate, the SoC authentication block 106H transmits a signal to one or more IP blocks 106 in the SoC 102, to signal indicating the state of the security mode (e.g., a binary flag or a bit vector). In response, IP blocks 106 expose debug data to the Debug Transport IP block 160C.

On the companion die 152, a Debug Transport IP block 154 is connected to a debug interface 156. The debug interface 156 on the companion die 152 is communicatively coupled to the debug interface 108 on the SoC 102, providing a chip-to-chip communication channel 190. Communication channel 190 may support JTAG, USB, 13C, or other protocols.

The companion die 152 also includes a communication port 158, which may be a wireless communication controller that implements time-sensitive networking (TSN) with gigabit Ethernet (GBE). The combination of TSN and GBE provides timely debugging results over a high-bandwidth communication channel. It is understood that other wired or wireless protocols may be used over the communication port 158 and that the communication port 158 may support several communication protocols.

A safety agent 160 on the companion die 152 is used to control communication with the SoC 102. The safety agent 160 may be a FUSA controller, in an embodiment. The safety agent 160 is used to bridge communication between the Debug Transport IP block 154 and the Debug Transport IP block 106C.

A remote host 180 is used to connect with the platform 100 via the communication port 158 to initiate a debugging session. The remote host 180 may be of any type of compute device, such as a desktop computer, laptop computer, mobile device, or the like. The remote host 180 may be operated by one or more human operators, who are authorized to access the SoC 102 and perform debugging operations on the SoC 102.

In operation, the safety agent 160 receives a signal from the remote host 180 to initiate a debugging session and interfaces with the Debug Transport IP block 154 on the companion die 152. The Debug Transport IP block 154 accesses an encryption key 162 stored on the companion die 152. The encryption key 162 is fused and only accessible to the Debug Transport IP block 154. The encryption key 162 may be a symmetric key, such as an Advanced Encryption Standard (AES) key. When using an AES key, the key may be a 128-bit, 192-bit, or 256-bit key. The encryption key 162 may be other types of symmetric keys, such as Twofish, Blowfish, or Triple DES. Alternatively, the encryption key 162 may be a private key using in a PKI scheme, such as RSA or PGP. In a PKI scheme, the companion chip 152 may store the private key and the SoC 102 and remote host 180 may hold the corresponding public key. The encryption key 162 is unique to the platform 100 and is fused in the companion die 152 and SoC 102 as part of the manufacturing process and is never exposed. A corresponding key 110 is stored on the SoC 102. Such keys may be fused in their respective circuitry (e.g., companion die 152 or SoC 102).

To initiate a remote debugging session, the remote host 180 is used to provide an authentication token, authenticating the user of the remote host 180 to the SoC 102. The safety agent 160 authenticates the remote user using one of various types of mechanisms, such as with a username-password pair.

When triggered (e.g., the user is authenticated), the safety agent 160 generates a set of debug handshake commands that are encrypted using a key 162 that are fused in the companion die 152. The handshake commands are transmitted to the SoC 102 and are used to establish a secure link between the SoC 102 and the companion die 152. The Debug Transport IP block 106C is able to distinguish the paired companion chip 152 based on the keys 162, 110. By being able to decrypt the debug handshake command, the SoC 102 is provided some assurance that the debug handshake command is authentic and that the companion chip 152 is trustworthy.

In an embodiment, a unique identifier of the companion die 152 is transmitted from the companion die 152 to the SoC 102 as the start of packet (SOP), which will be decoded by the Debug Transport IP block 106C to ensure that the decrypted first command matches the silicon hardcoded identifier. The unique identifier may be assigned at manufacture to the companion die 152. The unique identifier may be fused to prevent tampering. Upon successful authentication, the SoC authentication block 160H signals one or more IP blocks 106 on the SoC 102, indicating that a debugging session is being initiated and that debugging data should be provided to any debug commands. The signals may broadcast through the fabric 108 and may be a binary flag or a bit vector. A bit vector may be used with different levels or types of security modes, which when received at each IP block 106, causes different IP blocks 106 to expose varying amounts or types of information to debug commands.

Critical information may be accessed by the companion die 152 as orchestrated by the safety agent 160. During communication between the remote host 180 and SoC 102, the Debug Transport IP block 154 and Debug Transport IP block 106C are used to encrypt/decrypt data between the SoC 102 and companion die 152.

Figure 2:
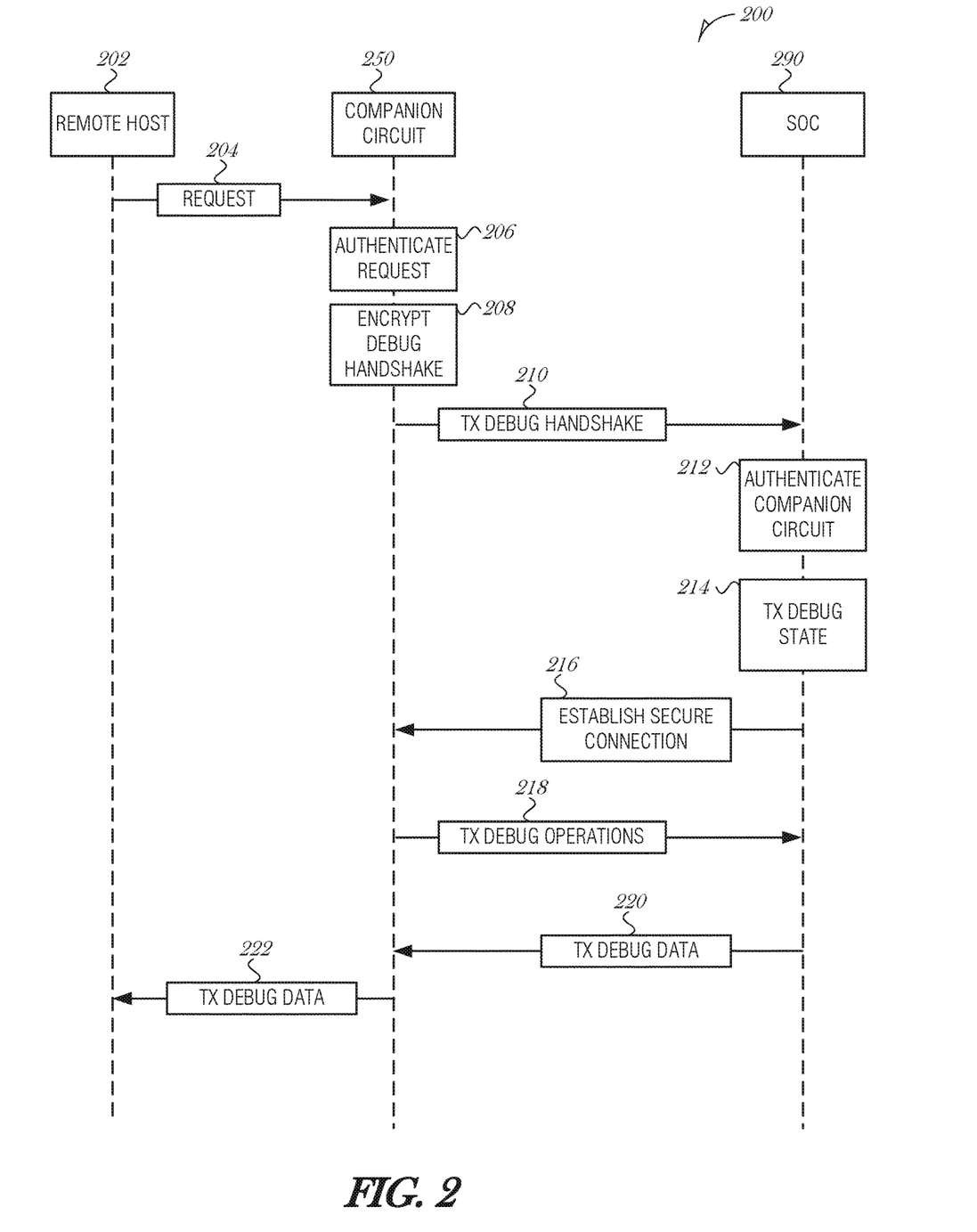
FIG. 2 is a swim lane diagram illustrating a process for secure SoC debug operations, according to an embodiment.

FIG. 2 is a swim lane diagram illustrating a process 200 for secure SoC debug operations, according to an embodiment. A remote host 202 (e.g., remote host 180) initiates the debugging session with a request (operation 204) to a companion circuit 250 (e.g., companion die 252) on platform shared with an SoC 290 (e.g., SoC 102) under test. The companion circuit 250 authenticates the request (operation 206) and if the authentication is successful, encrypts a debug handshake message. The encryption may be performed by a debug transport IP block on the companion circuit 250 using an encryption scheme with symmetric keys or asymmetric keys. The companion circuit 250 transmits the debug handshake message (operation 210) to the SoC 290. The SoC 90 authenticates the companion circuit 250 (operation 212). In an embodiment, the authentication is performed using a unique identifier and the key used to encrypt the handshake message. For instance, using a symmetric key such as AES, the SoC 290 will have some basis for validating that the handshake message came from the companion circuit 250. In addition, a unique identifier that identifies the companion circuit 250 may be provided to the SoC 290, which also has the unique identifier.

If the SoC 290 is able to authenticate the companion circuit 250, then a debug state message is transmitted to one or more IP blocks on the SoC 290 (operation 214). The debug state message may be a binary message or a bit vector. IP blocks may be configured such that when receiving the debug state message, the IP block will reconfigure itself and allow debug inquiries or provide debug data.

The SoC 290 establishes a secure connection with the companion circuit 250 (operation 216) using the encryption scheme. For instance, the SoC 290 and companion circuit 250 may have a predetermined AES key that is fused in each of the companion circuit 250 and SoC 290, and is used to provide secure communications.

Additional debug operations (operation 218) may be transmitted to the SoC 290 from the companion circuit 250. The debug operations may be provided by the remote host 202 or be initiated by the companion circuit 250. For instance, a debug coordinator (e.g., safety agent 160) may perform a debugging routine based on a predetermined set of debugging operations. Debug data is transmitted from the SoC 290 back to the companion circuit 250 (operation 220). The debug data may be from one or more IP blocks on the SoC 290. The companion circuit 250 may relay the debug data to the remote host 202 (operation 222). The debug data is encrypted from SoC 290 to companion circuit 250 and to remote host 202. In the case of an encryption scheme that uses symmetric key encryption (e.g., AES), each component (remote host 202, companion circuit 250, and SoC 290) may possess the same symmetric key. In the case of an asymmetric key encryption scheme, the companion circuit 250 may have a private key and each of the remote host 202 and SoC 290 may have a public key that corresponds to the companion circuit's private key.

Figure 3:
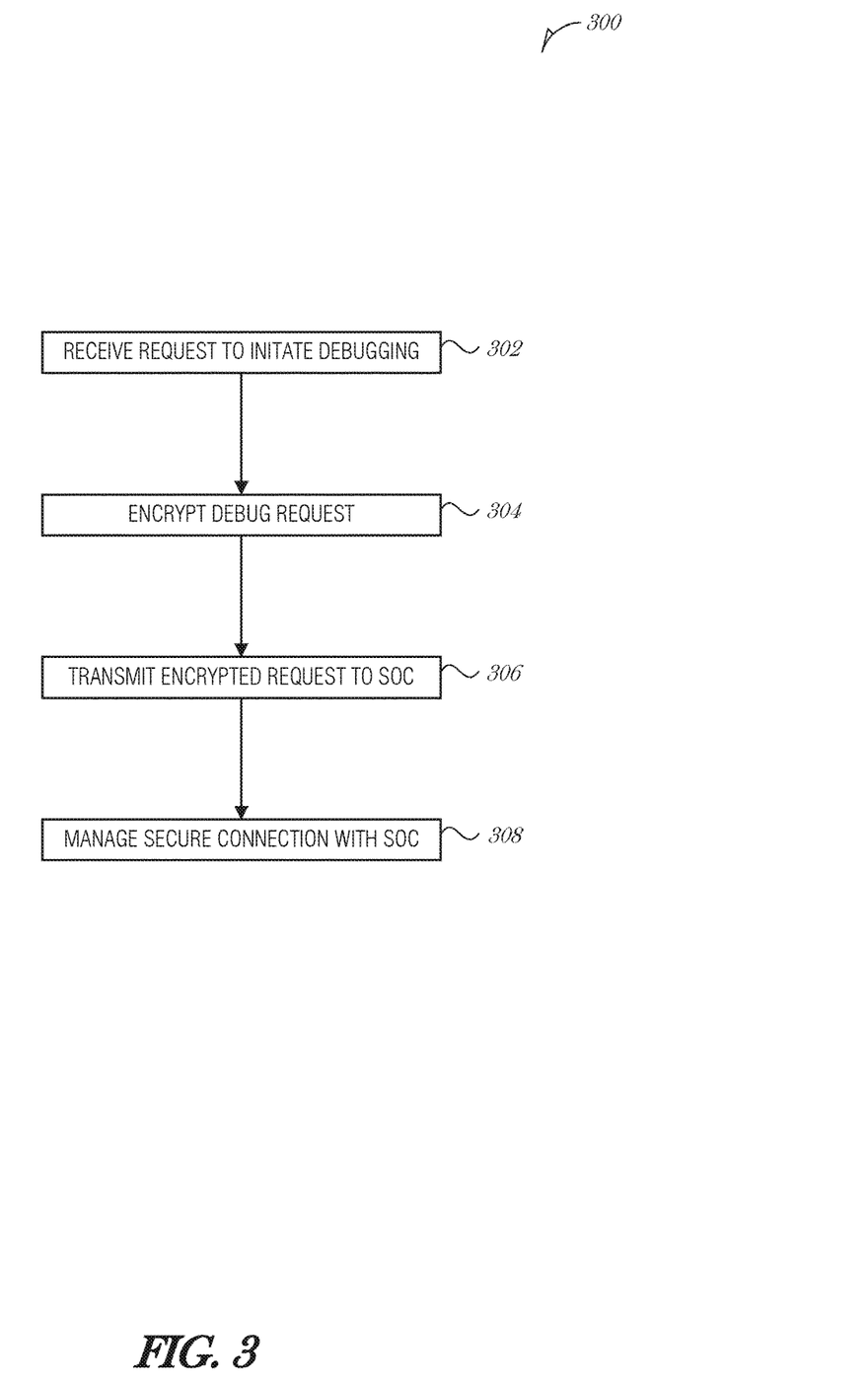
FIG. 3 is a flowchart illustrating a method for providing secure SoC debugging, according to an embodiment.

FIG. 3 is a flowchart illustrating a method 300 for providing secure SoC debugging, according to an embodiment. At 302, a debug initiation request is received from a remote host at a debug companion circuit, the debug initiation request to initiate a debugging session with an SoC associated with the debug companion circuit. In an embodiment, the debug companion circuit is a functional safety circuit.

At 304, a debug handshake command is encrypted at the debug companion circuit. In an embodiment, encrypting the debug handshake command includes encrypting the debugging request using a symmetric encryption scheme. In a further embodiment, the symmetric encryption scheme is advanced encryption standard (AES) encryption.

In an embodiment, encrypting the debug handshake command includes encrypting the debugging request using an asymmetric encryption scheme.

At 306, the debug handshake command is transmitted to the SoC from the debug companion circuit, where the SoC is configured to authenticate the debug companion circuit, and configure intellectual property (IP) blocks on the SoC to expose debug data to the debug companion circuit in response to authenticating the debug companion circuit. In an embodiment, to authenticate the debug companion circuit, the SoC is configured to decrypt the debug handshake command and authenticate the debug companion circuit based on whether the SoC is able to decrypt the debug handshake command.

In an embodiment, the debug handshake command includes a unique identifier of the debug companion circuit, and wherein the SoC authenticates the debug companion circuit using the unique identifier.

At 308, a secure connection with the SoC is managed to obtain debug data and report the debug data to the remote host.

In an embodiment, the IP blocks include a register. In a related embodiment, the IP blocks include a test access port (TAP). In a related embodiment, the IP blocks include a crash log. In a related embodiment, the IP blocks include an on-die logic analyzer.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 4:
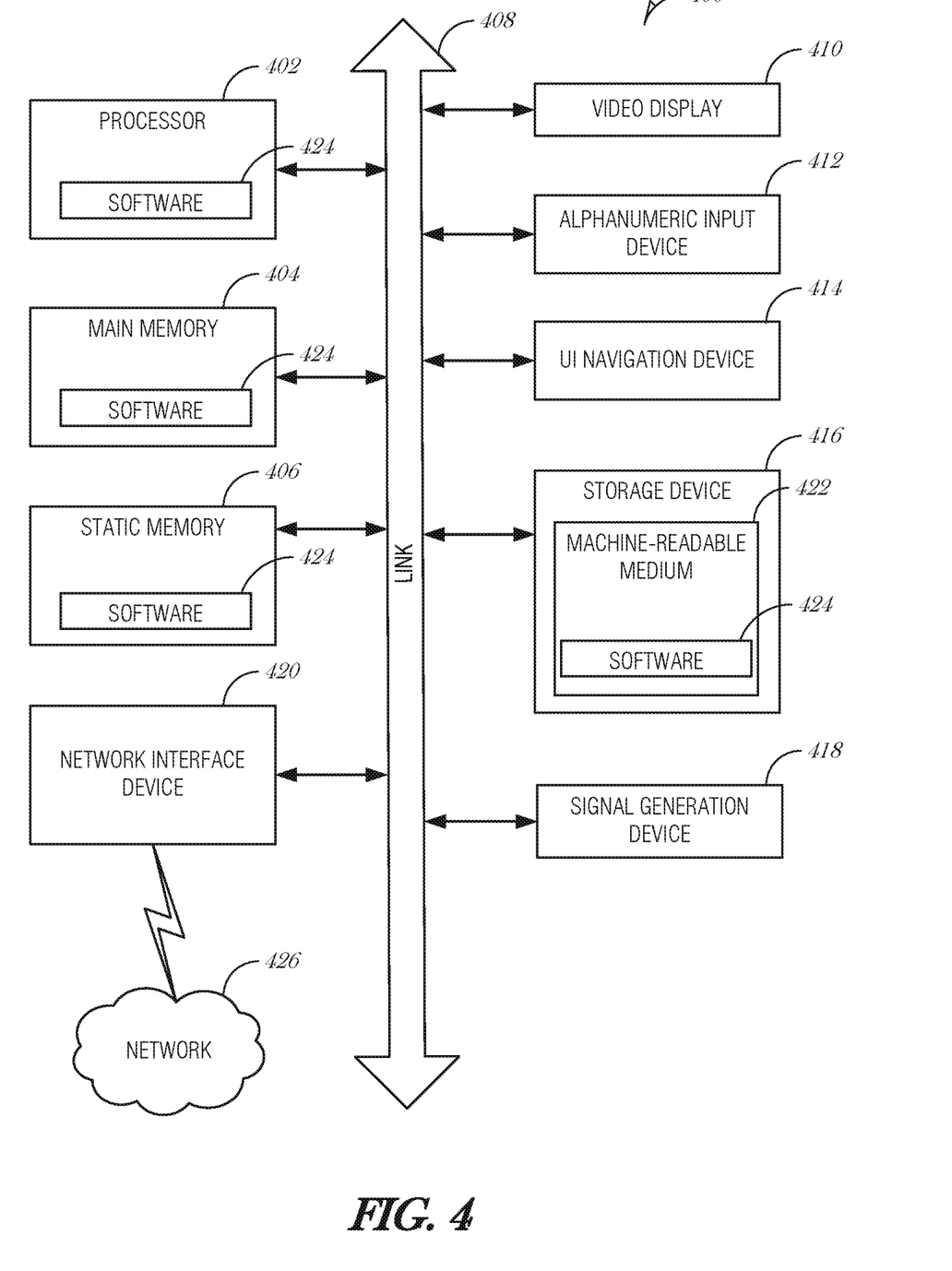
FIG. 4 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 4 is a block diagram illustrating a machine in the example form of a computer system 400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, gyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a debugging system, comprising: a system-on-a-chip (SoC) including: a first debug control circuitry; a first debug interface connected to the first debug control circuitry; and an intellectual property (IP) block connected to the first debug control circuitry; and a companion circuit including: a second debug control circuitry; a second debug interface connected to the second debug control circuitry; and a communication port to connect with a remote host, wherein the second debug control circuitry is to: receive a request to initiate a debugging session with the SoC from the remote host; construct a debug handshake message and encrypt the debug handshake message to produce an encrypted debug handshake message; transmit the encrypted debug handshake message to the SoC via the second debug interface and the first debug interface; wherein the first debug control circuitry is to: authenticate the companion circuit using the encrypted debug handshake message; broadcast a debug control signal to the IP block in response to the authentication of the companion circuit; and establish a secure connection with the second debug control circuitry to exchange debug commands and debug data.

In Example 2, the subject matter of Example 1 includes, wherein the companion circuit is a functional safety circuit.

In Example 3, the subject matter of Examples 1-2 includes, wherein the debug handshake message is encrypted using a symmetric encryption scheme.

In Example 4, the subject matter of Example 3 includes, wherein the symmetric encryption scheme is advanced encryption standard (AES) encryption.

In Example 5, the subject matter of Examples 1-4 includes, wherein the debug handshake command is encrypted using an asymmetric encryption scheme.

In Example 6, the subject matter of Examples 1-5 includes, wherein to authenticate the companion circuit, the first debug control circuitry is configured to decrypt the debug handshake message and authenticate the companion circuit based on whether the first debug control circuitry is able to decrypt the debug handshake message.

In Example 7, the subject matter of Examples 1-6 includes, wherein the debug handshake message includes a unique identifier of the companion circuit, and wherein the first debug control circuitry authenticates the companion circuit using the unique identifier.

In Example 8, the subject matter of Examples 1-7 includes, wherein the IP blocks include a register.

In Example 9, the subject matter of Examples 1-8 includes, wherein the IP blocks include a test access port (TAP).

In Example 10, the subject matter of Examples 1-9 includes, wherein the IP blocks include a crash log.

In Example 11, the subject matter of Examples 1-10 includes, wherein the IP blocks include an on-die logic analyzer.

Example 12 is a method of providing secure system-on-a-chip (SoC) debugging, the method comprising: receiving, from a remote host at a debug companion circuit, a debug initiation request to initiate a debugging session with an SoC associated with the debug companion circuit; encrypting, at the debug companion circuit, a debug handshake command; transmitting the debug handshake command to the SoC from the debug companion circuit, wherein the SoC is configured to authenticate the debug companion circuit, and configure intellectual property (IP) blocks on the SoC to expose debug data to the debug companion circuit in response to authenticating the debug companion circuit; and managing a secure connection with the SoC to obtain debug data and report the debug data to the remote host.

In Example 13, the subject matter of Example 12 includes, wherein the debug companion circuit is a functional safety circuit.

In Example 14, the subject matter of Examples 12-13 includes, wherein encrypting the debug handshake command comprises encrypting the debugging request using a symmetric encryption scheme.

In Example 15, the subject matter of Example 14 includes, wherein the symmetric encryption scheme is advanced encryption standard (AES) encryption.

In Example 16, the subject matter of Examples 12-15 includes, wherein encrypting the debug handshake command comprises encrypting the debugging request using an asymmetric encryption scheme.

In Example 17, the subject matter of Examples 12-16 includes, wherein to authenticate the debug companion circuit, the SoC is configured to decrypt the debug handshake command and authenticate the debug companion circuit based on whether the SoC is able to decrypt the debug handshake command.

In Example 18, the subject matter of Examples 12-17 includes, wherein the debug handshake command includes a unique identifier of the debug companion circuit, and wherein the SoC authenticates the debug companion circuit using the unique identifier.

In Example 19, the subject matter of Examples 12-18 includes, wherein the IP blocks include a register.

In Example 20, the subject matter of Examples 12-19 includes, wherein the IP blocks include a test access port (TAP).

In Example 21, the subject matter of Examples 12-20 includes, wherein the IP blocks include a crash log.

In Example 22, the subject matter of Examples 12-21 includes, wherein the IP blocks include an on-die logic analyzer.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is an apparatus for providing secure system-on-a-chip (SoC) debugging, the apparatus comprising: means for receiving, from a remote host at a debug companion circuit, a debug initiation request to initiate a debugging session with an SoC associated with the debug companion circuit; means for encrypting, at the debug companion circuit, a debug handshake command; means for transmitting the debug handshake command to the SoC from the debug companion circuit, wherein the SoC is configured to authenticate the debug companion circuit, and configure intellectual property (IP) blocks on the SoC to expose debug data to the debug companion circuit in response to authenticating the debug companion circuit; and means for managing a secure connection with the SoC to obtain debug data and report the debug data to the remote host.

In Example 26, the subject matter of Example 25 includes, wherein the debug companion circuit is a functional safety circuit.

In Example 27, the subject matter of Examples 25-26 includes, wherein the means for encrypting the debug handshake command comprise means for encrypting the debugging request using a symmetric encryption scheme.

In Example 28, the subject matter of Example 27 includes, wherein the symmetric encryption scheme is advanced encryption standard (AES) encryption.

In Example 29, the subject matter of Examples 25-28 includes, wherein the means for encrypting the debug handshake command comprise means for encrypting the debugging request using an asymmetric encryption scheme.

In Example 30, the subject matter of Examples 25-29 includes, wherein to authenticate the debug companion circuit, the SoC is configured to decrypt the debug handshake command and authenticate the debug companion circuit based on whether the SoC is able to decrypt the debug handshake command.

In Example 31, the subject matter of Examples 25-30 includes, wherein the debug handshake command includes a unique identifier of the debug companion circuit, and wherein the SoC authenticates the debug companion circuit using the unique identifier.

In Example 32, the subject matter of Examples 25-31 includes, wherein the IP blocks include a register.

In Example 33, the subject matter of Examples 25-32 includes, wherein the IP blocks include a test access port (TAP).

In Example 34, the subject matter of Examples 25-33 includes, wherein the IP blocks include a crash log.

In Example 35, the subject matter of Examples 25-34 includes, wherein the IP blocks include an on-die logic analyzer.

Example 36 is at least one machine-readable medium including instructions for providing secure system-on-a-chip (SoC) debugging, which when executed by a machine, cause the machine to perform operations comprising: receiving, from a remote host at a debug companion circuit, a debug initiation request to initiate a debugging session with an SoC associated with the debug companion circuit; encrypting, at the debug companion circuit, a debug handshake command; transmitting the debug handshake command to the SoC from the debug companion circuit, wherein the SoC is configured to authenticate the debug companion circuit, and configure intellectual property (IP) blocks on the SoC to expose debug data to the debug companion circuit in response to authenticating the debug companion circuit; and managing a secure connection with the SoC to obtain debug data and report the debug data to the remote host.

In Example 37, the subject matter of Example 36 includes, wherein the debug companion circuit is a functional safety circuit.

In Example 38, the subject matter of Examples 36-37 includes, wherein encrypting the debug handshake command comprises encrypting the debugging request using a symmetric encryption scheme.

In Example 39, the subject matter of Example 38 includes, wherein the symmetric encryption scheme is advanced encryption standard (AES) encryption.

In Example 40, the subject matter of Examples 36-39 includes, wherein encrypting the debug handshake command comprises encrypting the debugging request using an asymmetric encryption scheme.

In Example 41, the subject matter of Examples 36-40 includes, wherein to authenticate the debug companion circuit, the SoC is configured to decrypt the debug handshake command and authenticate the debug companion circuit based on whether the SoC is able to decrypt the debug handshake command.

In Example 42, the subject matter of Examples 36-41 includes, wherein the debug handshake command includes a unique identifier of the debug companion circuit, and wherein the SoC authenticates the debug companion circuit using the unique identifier.

In Example 43, the subject matter of Examples 36-42 includes, wherein the IP blocks include a register.

In Example 44, the subject matter of Examples 36-43 includes, wherein the IP blocks include a test access port (TAP).

In Example 45, the subject matter of Examples 36-44 includes, wherein the IP blocks include a crash log.

In Example 46, the subject matter of Examples 36-45 includes, wherein the IP blocks include an on-die logic analyzer.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A debugging system, comprising:
    a system-on-a-chip (SoC) including:
        a first debug control circuitry;
        a first debug interface connected to the first debug control circuitry; and
        an intellectual property (IP) block connected to the first debug control circuitry; and
    a companion circuit including:
        a second debug control circuitry;
        a second debug interface connected to the second debug control circuitry; and
        a communication port to connect with a remote host;
    wherein the SoC and the companion circuit are located on a shared platform;
    wherein the second debug control circuitry is to:
        receive a request to initiate a debugging session with the SoC from the remote host;
        construct a debug handshake message and encrypt the debug handshake message to produce an encrypted debug handshake message;
        transmit the encrypted debug handshake message to the SoC via the second debug interface and the first debug interface;
    wherein the first debug control circuitry is to:
        authenticate the companion circuit using the encrypted debug handshake message;
        broadcast a debug control signal to the IP block in response to the authentication of the companion circuit, wherein the debug control signal indicates a state of a security mode of the SOC; and
        establish a secure connection with the second debug control circuitry to exchange debug commands and debug data, and wherein an amount or a type of information exposed to the debug commands are based on the state of the security mode.

2. The system of claim 1, wherein the companion circuit is a functional safety circuit.

3. The system of claim 1, wherein the debug handshake message is encrypted using a symmetric encryption scheme.

4. The system of claim 3, wherein the symmetric encryption scheme is advanced encryption standard (AES) encryption.

5. The system of claim 1, wherein the debug handshake command is encrypted using an asymmetric encryption scheme.

6. The system of claim 1, wherein to authenticate the companion circuit, the first debug control circuitry is configured to decrypt the debug handshake message and authenticate the companion circuit based on whether the first debug control circuitry is able to decrypt the debug handshake message.

7. The system of claim 1, wherein the debug handshake message includes a unique identifier of the companion circuit, and wherein the first debug control circuitry authenticates the companion circuit using the unique identifier.

8. The system of claim 1, wherein the IP blocks include a register.

9. The system of claim 1, wherein the IP blocks include a test access port (TAP).

10. The system of claim 1, wherein the IP blocks include a crash log.

11. The system of claim 1, wherein the IP blocks include an on-die logic analyzer.

12. The debugging system of claim 1, wherein the state of the security mode includes a level or a type of the security mode.

13. A method of providing secure system-on-a-chip (SoC) debugging, the method comprising:
    receiving, from a remote host at a debug companion circuit, a debug initiation request to initiate a debugging session with an SoC associated with the debug companion circuit;
    encrypting, at the debug companion circuit, a debug handshake command;
    transmitting the debug handshake command to the SoC from the debug companion circuit, wherein the SoC is configured to authenticate the debug companion circuit, and configure intellectual property (IP) blocks on the SoC to expose debug data to the debug companion circuit in response to authenticating the debug companion circuit, wherein the SoC broadcasts a debug control signal, wherein the debug control signal indicates a state of a security mode of the SoC, wherein an amount or a type of information exposed to a debug command is based on the state of the security mode, and wherein the SoC and the debug companion circuit are located on a shared platform; and
    managing a secure connection with the SoC to obtain debug data and report the debug data to the remote host.

14. The method of claim 13, wherein the debug companion circuit is a functional safety circuit.

15. The method of claim 13, wherein encrypting the debug handshake command comprises encrypting the debugging request using a symmetric encryption scheme.

16. The method of claim 15, wherein the symmetric encryption scheme is advanced encryption standard (AES) encryption.

17. The method of claim 13, wherein encrypting the debug handshake command comprises encrypting the debugging request using an asymmetric encryption scheme.

18. The method of claim 13, wherein to authenticate the debug companion circuit, the SoC is configured to decrypt the debug handshake command and authenticate the debug companion circuit based on whether the SoC is able to decrypt the debug handshake command.

19. The method of claim 13, wherein the debug handshake command includes a unique identifier of the debug companion circuit, and wherein the SoC authenticates the debug companion circuit using the unique identifier.

20. The method of claim 13, wherein the IP blocks include a register.

21. The method of claim 13, wherein the IP blocks include a test access port (TAP).

22. The method of claim 13, wherein the IP blocks include a crash log.

23. The method of claim 13, wherein the IP blocks include an on-die logic analyzer.

24. The method of claim 13, wherein the state of the security mode includes a level or a type of the security mode.

25. At least one non-transitory machine-readable medium including instructions for providing secure system-on-a-chip (SoC) debugging, which when executed by a machine, cause the machine to perform operations comprising:

receiving, from a remote host at a debug companion circuit, a debug initiation request to initiate a debugging session with an SoC associated with the debug companion circuit;

encrypting, at the debug companion circuit, a debug handshake command;

transmitting the debug handshake command to the SoC from the debug companion circuit, wherein the SoC is configured to authenticate the debug companion circuit, and configure intellectual property (IP) blocks on the SoC to expose debug data to the debug companion circuit in response to authenticating the debug companion circuit, wherein the SoC broadcasts a debug control signal, wherein the debug control signal indicates a state of a security mode of the SoC, wherein an amount or a type of information exposed to a debug command is based on the state of the security mode, and wherein the SoC and the debug companion circuit are located on a shared platform; and managing a secure connection with the SoC to obtain debug data and report the debug data to the remote host.

26. The at least one non-transitory machine-readable medium of claim 25, wherein encrypting the debug handshake command comprises encrypting the debugging request using an asymmetric encryption scheme.

27. The at least one non-transitory machine-readable medium of claim 25, wherein to authenticate the debug companion circuit, the SoC is configured to decrypt the debug handshake command and authenticate the debug companion circuit based on whether the SoC is able to decrypt the debug handshake command.

28. The at least one non-transitory machine-readable medium of claim 25, wherein the state of the security mode includes a level or a type of the security mode.

* * * * *